United States Patent [19] [11] Patent Number: 4,887,647
Igarashi et al. [45] Date of Patent: Dec. 19, 1989

[54] HOSE

[75] Inventors: Ichiro Igarashi; Hiroaki Ito; Kazuhiko Nishimura, all of Aichi, Japan

[73] Assignee: Tokai Rubber Industries, Ltd., Komaki, Japan

[21] Appl. No.: 206,792

[22] Filed: Jun. 15, 1988

[30] Foreign Application Priority Data

Jul. 8, 1987 [JP] Japan .................. 62-171670

[51] Int. Cl.$^4$ ............................. F16L 11/04
[52] U.S. Cl. .................... 138/126; 138/125; 138/137; 138/177; 138/DIG. 7
[58] Field of Search .............. 138/125, 126, 137, 141, 138/177, 178, DIG. 2, DIG. 3, DIG. 7

[56] References Cited

U.S. PATENT DOCUMENTS

Re. 32,230  8/1986  Satoh et al. .................. 138/137
3,899,807   8/1975  Sovish et al. ................. 138/178
4,169,754  10/1979  Perrotta ...................... 138/DIG. 2
4,361,678  11/1982  Tatemoto et al. .............. 525/384
4,403,796   9/1983  Ledbetter et al. ............. 138/125 X
4,457,799   7/1984  Dunn .......................... 138/137

Primary Examiner—James E. Bryant, III
Attorney, Agent, or Firm—Armstrong, Nikaido, Marmelstein, Kubovcik & Murray

[57] ABSTRACT

In rubber hoses for conveying fuels, the inner tube rubber layer coming into contact with fuels generally comprises two sublayers, namely the inside fluororubber layer coming into direct contact with fuels and the outside layer of an NBR and the like. The fluororubber layer is undesirably subject to degradation due to amine type additives contained in fuels and is poor in adhesion to the outside layer. In accordance with the invention, the contents of vinylidene fluoride, one of the fluororubber constituents, is reduced to 10-50 mole percent and at the same time a monomer capable of causing crosslinking of the fluororubber in the presence of a peroxide is newly added as a component of the fluororubber composition in a specified amount. The results are prevention of the degradation due to amine type additives and improved adhesion to the outside layer.

5 Claims, 1 Drawing Sheet

HOSE

BACKGROUND OF THE INVENTION

1. Field of the Invention

This invention relates to a hose, in particular a rubber hose for conveying fuels which is used for connecting metal pipes in the automobile engine room.

2. Description of the Prior Art

Rubber hoses 4 so far used for conveying fuels has, as shown in FIG. 2 in the accompanying drawing, a three-layer structure, namely an inner tube rubber layer 1, a reinforcing textile layer 2 and a weatherresistant outer tube rubber layer 3. In connecting two metal pipes 5, as shown in FIG. 3, both ends of such a hose are respectively put on terminal portions of the pipes 5 in the telescopic manner and then fastened by means of fastener bands 6. However, as a result of recent remarkable technological advances in the automobile industry, in particular increases in fuel pressure and temperature as exhaust emission control measures, the engine room inside is exposed to a very wide range of temperature changes, from a temperature as high as 100° C. to a temperature as low as −40° C. Moreover, gasoline undergoes oxidation and circulates as sour gasoline (gasoline containing peroxides as a result of oxidation at high temperatures). For these and other reasons, automobile fuel hoses are required to have such performance characteristics as would render themselves usable even under severer conditions than before. Under these circumstances, conventional rubber hoses whose inner tube rubber layer is made of a gasoline-resistant general-purpose polymer are no longer usable. Furthermore, gasoline is a limited resource and will anticipatedly be in short supply in the future and therefore attempts are being, made to use a gasoline-alcohol mixture as a fuel to cope with the future situation. Thus it becomes necessary to provide an inner tube rubber layer which is resistant to alcohols highly erosive to rubbers. From these viewpoints, there may be mentioned fluororubbers (also known under the name "FKM") as materials which are satisfactory as far as the performance characteristics mentioned above are concerned. Said fluororubbers have good resistance to heat, sour gasoline, etc. On the other hand, however, their low-temperature characteristics are unsatisfactory and they are subject to cracking due to amine-type additives contained in gasoline. Moreover, they are expensive. Therefore, a measure currently taken comprises forming the inner tube rubber layer, which is internal to the outer tube rubber layer, as a double layer, the inside layer of which is a thin layer of a fluororubber and the outside layer of which is made of a rubber having good low-temperature characteristics, namely a hydrin rubber or an acrylonitrile-butadiene rubber (hereinafter abbreviated as NBR). Nevertheless, the product hoses are still unsatisfactory with respect to costs and amine-caused degradation. They are unsatisfactory in interlayer adhesion between the outside NBR layer and the inside fluororubber layer of the inner tube rubber layer.

Meanwhile, polymer blends composed of an acryl rubber and a fluororesin have been developed as materials which are comparable in sour gasoline resistance and other performance characteristics to the above-mentioned fluororubbers and are fairly inexpensive as compared with the fluororubbers. However, since they are blends, the hardness after curing is high. Thus, hoses manufactured by using them will have insufficient flexibility. Accordingly, rubber hoses which are inexpensive, have all the performance characteristics required of rubber hoses for conveying fuels and, in addition, have good low-temperature characteristics should desirably be provided.

It is an object of the invention, which has been completed under these circumstances, to provide hoses which are inexpensive, are excellent in performance characteristics, such as heat resistance, gasoline resistance, sour gasoline resistance and low-temperature characteristics, and furthermore have good flexibility and durability.

SUMMARY OF THE INVENTION

In accordance with the present invention, the above object can be achieved by providing a hose characterized in that at least the inside layer of the inner tube rubber layer thereof is made of a fluororubber composition in which the fluororubber is a copolymer of tetrafluoroethylene, vinylidene fluoride and hexafluoropropylene and which contains, as a fourth component, a monomer capable of causing crosslinking of the fluororubber in the presence of a peroxide and in that said vinylidene fluoride accounts for 10–50 mole percent based on the comonomers in total and the proportion of said fourth component monomer is not more than 2 parts by weight per 100 parts by weight of the comonomers in total.

Figure 1:
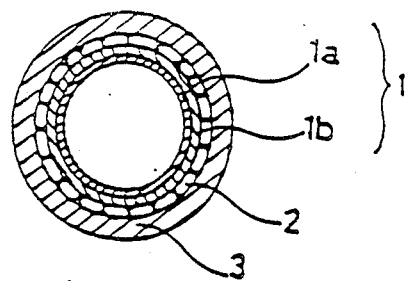
FIG. 1 shows, in transverse cross section, an embodiment of the invention.
Figure 2:
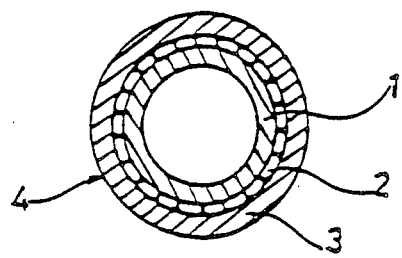
FIG. 2 shows, in transverse cross section, a prior art hose.
Figure 3:
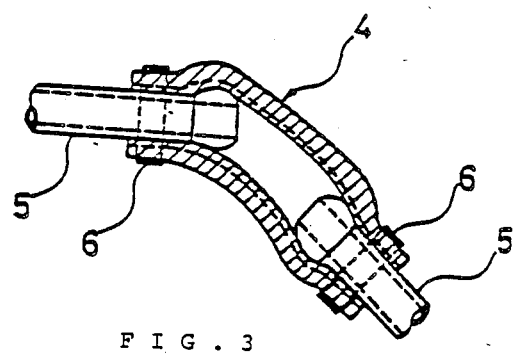
FIG. 3 shows, in longitudinal cross section, the manner of use of a hose in question.

In the figures, the reference numeral 1 indicates the inner tube rubber layer, 1a the inside layer thereof, 1b the outside layer thereof, 2 a reinforcing layer, 3 the outer tube rubber layer, and 4 the rubber hose as a whole.

DETAILED DESCRIPTION OF THE INVENTION

As a result of a series of investigations made in an attempt to improve the amine resistance and interlayer adhesion of prior art hoses manufactured by using a fluororubber and an NBR, the present inventors found that improvements in interlayer adhesion, sour gasoline resistance and amine resistance can be attained when the content of vinylidene fluoride (hereinafter abbreviated as F-Vd) among the fluororubber constituents tetrafluoroethylene (hereinafter abbreviated as 4FE), vinylidene fluoride and hexafluoropropylene (hereinafter abbreviated as 6FP) is adjusted to a level lower than in the prior art and, at the same time, a monomer capable of causing crosslinking of the fluororubber in the presence of a peroxide is added. This finding has now led to completion of the present invention.

The hose according to the invention is produced by using a particular fluororubber and a monomer capable of causing crosslinking in the presence of a peroxide.

Said fluororubber is, for example, a ternary fluororubber produced by using 4FE, F-Vd and 6FP as essential constituents. The proportion of F-Vd among the above-mentioned essential constituents should preferably be 10–50 mole percent, more preferably 10–40 mole percent, on the whole fluororubber basis. When said proportion exceeds 50 mole percent, the fuel resistance, among others, will become worse. When said proportion is below 10 mole percent, which means a relatively increased 4FE content, the fluororubber has an almost resin-like composition and, as a result, its rigidity will be high and decreases in interlayer adhesion between the fluororubber layer and a layer of another substance will result. Consequently, the total proportion of 4FE and 6FP becomes 90-50 mole percent. By adjusting in the above manner the F-Vd content within the above range so that the resulting fluororubber can have an appropriate hardness, excellent effects can be produced. In particular when the F-Vd content is within the above range and the total fluorine content of the fluororubber is not less than 69 percent, improvement in sour gasoline resistance and prevention of degradation due to amine type additives can be realized with efficiency.

Usable as the above-mentioned monomer capable of causing crosslinking in the presence of a peroxide are mono- or di-iodine- or bromine-substituted organic compounds having an electron-attracting group but free of any double bond, for example perfluoroisopropyl iodide or bromide, 1,4-diiodo(or bromo)perfluorobutane and 1,6-diiodo(or bromo)perfluorohexane. When these monomers are added to the fluororubber mentioned above either singly or in combination and copolymerization thereof is caused to take place, it is possible to maintain firm and strong interlayer adhesion between the layer of the fluororubber composition according to the invention and the layer of another substance after construction of a double layer structure from said layers. The level of addition of said monomer should preferably be within the range of 0.001-2 parts by weight per 100 parts by weight of the three components 4FE, F-Vd and 6FP in total.

The hose according to the invention is manufactured by forming the inner tube rubber layer thereof from a fluororubber composition containing the above-mentioned ternary fluororubber and the above-mentioned monomer (fourth component) capable of causing crosslinking of said fluororubber in the presence of a peroxide. While said inner tube rubber layer may have a single layer structure made of the fluororubber composition, it is preferable from the cost and hose flexibility viewpoints for the inner tube rubber layer to have a double layer structure, the inside layer thereof being a thin layer of the fluororubber composition and the outside layer being made of an NBR. The inner tube rubber layer made of the fluororubber composition or the inside fluororubber composition layer of the inner tube rubber layer should preferably have a thickness of 10-500 micrometers, more preferably 100-300 micrometers.

The hose according to the present invention thus has the inner tube rubber layer (or the inside layer thereof) made of a composition containing at least the above-mentioned fluororubber and the above-mentioned fourth component monomer. When the inner tube rubber layer has a two-layer laminated structure, such hose can be manufactured, for example, in the following manner. Thus, a fluororubber composition (compound) kneaded on a cold roll and an NBR composition processed in the same manner are coextruded from an extruder to form the inner tube rubber layer. Alternatively, two extruders are used and the outer layer (NBR layer) is extruded to cover the inner layer (fluororubber layer) and form the inner tube rubber layer. A reinforcing textile layer is then formed on the inner tube rubber layer, the resulting composite is further covered with the outer tube rubber layer extruded from an extruder, and the whole is cured for simultaneous attainment of adhesion. In that case, the curing conditions are generally as follows: temperature 145°-180° C. × time 15-90 minutes. One of the hoses obtained in this manner is shown in FIG. 1, wherein the reference numeral 1a indicates the outside layer consisting of a fluororubber composition according to the invention, and 1b the outside layer consisting of an NBR composition, the inner tube rubber layer thus having a double structure consisting of said inside layer 1a and said outside layer 1b. The numeral 2 indicates a reinforcing textile layer which is known in the art, and 3 indicates the outer tube rubber layer.

The hose thus obtained is excellent in gasoline resistance and sour gasoline resistance and has good low-temperature characteristics. The deterioration in low-temperature characteristics which is observed with a polymer blend composed of an acryl rubber and a fluororesin does not take place here. The addition of the monomer capable of causing crosslinking in the presence of a peroxide also serves to prevent the interlayer adhesion to decrease.

Since it has the above construction, the hose according to the invention is excellent in performance characteristics, in particular in gasoline resistance, sour gasoline resistance, solvent resistance and heat resistance. Even the two-layer laminate structure with the rubber layer consisting of another composition does not produce any interlayer adhesion-related problems. When the two-layer structure of the inner tube rubber layer is employed, it is possible to reduce the cost of production. Furthermore, said hose is excellent in low-temperature characteristics. Therefore, said hose can endure severe conditions of use satisfactorily and is best suited for use as a hose for conveying fuels in automobiles where sealing property under high pressure must be maintained for a long period of time under said severe conditions.

The following examples and comparative examples further illustrate the invention.

EXAMPLES 1-3 AND COMPARATIVE EXAMPLES 1 AND 2

Two fluororubber compositions were prepared according to Table 1 and Table 2 given below. For use in Comparative Example 2, a 4FE-6FP copolymer (FEP; resin with 0% F-Vd content) was also prepared.

TABLE 1

| Fluorobber composition (F-1) (Note 1) | |
|---|---|
| Fluorobber (Note 2) | 100 parts by weight |
| MgO | 3 parts by weight |
| Ca(OH)$_2$ | 6 parts by weight |
| MT carbon | 25 parts by weight |

Note 1
Binary fluororubber composition with 60 mole percent F—Vd content.
Note 2
Dai-el G-704, curing agent-containing master batch, Daikin Industries, Ltd.

TABLE 2

| Fluororubber composition (F-2) (Note 3) | |
|---|---|
| Fluororubber | 100 parts by weight |
| MgO | 5 parts by weight |
| MT carbon | 25 parts by weight |
| Triallyl isocyanate | 2 parts by weight |

TABLE 2-continued

Fluororubber composition (F-2) (Note 3)

| | |
|---|---|
| Perhexa 2.5B | 1.5 parts by weight |

Note 3
Ternary fluororubber composition with 30 mole percent F—Vd content, the formulation being as follows:
4FE 40 mole percent
F—Vd 30 mole percent
6FP 30 mole percent
1,4-Diiodoperfluorobutane 0.5 part by weight per 100 parts by weight of the above three-component polymer.

Separately, an NBR composition was prepared according to Table 3 given below.

TABLE 3

NBR composition

| | | |
|---|---|---|
| NBR (Note 4) | 100 | parts by weight |
| Stearic acid | 1 | parts by weight |
| ZnO | 5 | parts by weight |
| ZEF carbon | 30 | parts by weight |
| Calcium carbonate | 30 | parts by weight |
| Plasticizer | 15 | parts by weight |
| MgO | 5 | parts by weight |
| Silica | 20 | parts by weight |
| Accelerator | 3.3 | parts by weight |
| Sulfur | 0.5 | parts by weight |

Note 4
DN-202, Nippon Zeon Co., Ltd.

Furthermore, a known species of epichlorohydrin rubber was prepared as the material for forming the outer tube rubber layer.

Rubber hoses were manufactured by using the above-mentioned materials and extruding the inner tube rubber layer, a reinforcing textile layer and the outer tube rubber layer. The inner tube rubber layer construction and the outer tube rubber layer construction are shown in Table 4 given below. In said table, F-1 stands for the fluororubber composition specified in Table 1, F-2 for the fluororubber composition specified in Table 2, and N for the NBR composition specified in Table 3. C stands for the epichlorohydrin rubber used.

The thus-obtained rubber hoses were tested for bending stress, sour gasoline permeability, alcohol-gasoline resistance, oil degradation and inner tube interlayer adhesion. The results obtained are also shown in Table 4. The data shown in the table indicate that the hoses of Examples 1-3 all have good characteristics.

TABLE 4

| | Comparative Example | | Example | | |
|---|---|---|---|---|---|
| | 1* | 2** | 1* | 2*** | 3* |
| Constitution of inner tube rubber layer | | | | | |
| Inside layer | F-1 | FEP | F-2 | F-2 | F-2 |
| Outside layer | N | N | N | N | N |
| Constitution of outer tube rubber layer | C | C | C | C | C |
| Bending stress (g) | 150 | 300 | 130 | 150 | 170 |
| Sour gasoline permeability (g) | 3.5 | 0.9 | 3.6 | 2.4 | 1.8 |
| Alcohol-gasoline resistance | x | o | o | o | o |
| Oil resistance | x | o | o | o | o |
| Inner tube interlayer adhesion | o | x | o | o | o |

*Thickness of the inside layer of the inner tube rubber layer = 0.5 mm; thickness of the outside layer = 1.2 mm; thickness of the outer tube rubber layer = 1.0 mm.
**Thickness of the inside layer of the inner tube rubber layer = 0.1 mm, thickness of the outside layer = 1.6 mm; thickness of the outer tube rubber layer = 1.0 mm.
***Thickness of the inside layer of the inner tube rubber layer = 0.3 mm; thickness of the outside layer = 1.4 mm; thickness of the outer tube rubber layer = 1.0 mm.

The tests referred to in Table 4 were performed by the following methods: "Bending stress"

A hose specimen having a length of 200 mm is bent at a curvature radius of 25 mm and the force required (in grams) is measured. The greater the value, the more lacking in flexibility. "Sour gasoline permeability"

A hose specimen having a length of 500 mm is filled with Fuel B/LPO 1% gasoline and the change in hose weight due to gasoline permeation is measured and expressed in terms of grams per unit inside surface area per day. "Alcohol-gasoline resistance"

A hose specimen having a length of 200 mm is filled with Fuel B/methanol (15/85) mixed gasoline and, after 168 hours of standing at 40° C., whether the hose outside diameter has changed or not is judged. The symbol X means that there is a noticeable change in outside diameter and O means that there is no such change. "Oil resistance"

A hose specimen having a length of 200 mm is filled with a commercial SF grade engine oil. After 500 hours of aging at 150° C., the hose specimen is cut open and turned inside out and examined for occurrence of cracking. The symbol X means occurrence of cracking, while O means no cracking. "Inner tube interlayer adhesion"

An interlayer peeling test is performed. The symbol X means that the interface between the two layers forming the inner tube rubber layer is visible, while the symbol O means that there is no interface visible.

What is claimed is:

1. A hose comprising an inner rubber tube, said inner rubber tube comprising an innermost rubber layer, wherein said innermost rubber layer is made from a fluororubber composition consisting essentially of a fluororubber and a compound capable of causing crosslinking of the fluororubber in the presence of a peroxide, wherein said fluororubber is a copolymer of three comonomers which are tetrafluorethylene, vinylidene fluoride and hexafluoropropylene, wherein the amount of vinylidene fluoride in said fluororubber is in the range of 10–50 mole % based on the total amount of said comonomers, and the amount of said compound capable of causing crosslinking of the fluororubber is not more than 2.0 parts by weight per 100 parts by weight of the total amount of said comonomers.

2. The hose of claim 1, wherein said compound capable of causing crosslinking of the fluororubber is selected from the group consisting of perfluoroisopropyl iodide, perfluoroisopropyl bromide, 1,4-diiodo-perfluorobutane, 1,4-dibromo-perfluorobutane, 1,6-diiodo-perfluorohexane and 1,6-dibromo-perfluorohexane.

3. The hose of claim 1, wherein said inner rubber tube has a two-layer laminated structure in which said innermost rubber layer is laminated to a layer of acrylonitrile-butadiene rubber.

4. The hose of claim 1, wherein the thickness of said innermost rubber layer is in the range of 10–100 μm.

5. The hose of claim 1, wherein the amount of said compound capable of causing crosslinking of the fluororubber is in the range of 0.001–2.0 parts by weight per 100 parts by weight of the total amount of said comonomers.

* * * * *